US006036052A

United States Patent [19]
Tong

[11] Patent Number: 6,036,052

[45] Date of Patent: Mar. 14, 2000

[54] ROLLER MECHANISM FOR A LOTTERY TICKET MACHINE

[76] Inventor: Hui-Jin Tong, P.O. Box 90, Tainan City, Taiwan

[21] Appl. No.: 09/021,994

[22] Filed: Feb. 11, 1998

[51] Int. Cl.[7] .......... B65G 59/00

[52] U.S. Cl. .......... 221/259; 221/255; 221/277; 271/10.11

[58] Field of Search .......... 221/7, 197, 255, 221/259, 268, 277; 271/10.11, 23

[56] References Cited

U.S. PATENT DOCUMENTS

| | | | |
|---|---|---|---|
| 5,803,308 | 9/1998 | Rong | 221/7 |
| 5,833,104 | 11/1998 | Horniak et al. | 221/259 X |
| 5,938,073 | 8/1999 | Chang | 221/259 |
| 5,941,414 | 8/1999 | Kasper | 221/259 X |

*Primary Examiner*—Christopher P. Ellis
*Assistant Examiner*—Gene O. Crawford

[57] ABSTRACT

A roller mechanism for a lottery ticket machine includes a face plate, a compartment, a roller unit, two position hook bars, a gear unit, and a motor device. The roller unit has a main and a subordinate rollers both provided with a pattern. The motor has a worm to rotate the gear unit and then the rollers. The position hook bars press elastically the subordinate roller to engage the main roller. The main roller rotates the subordinate roller in the reverse direction, rolling out a lottery ticket out from the two rollers. But when a lottery ticket is pulled by external force, the patterns of the rollers clamp the upper and the lower surface of the lottery ticket and increase friction, and the subordinate roller shrinks inward the position hook bars to engage tightly the main roller to prevent the lottery ticket from being pulled out.

3 Claims, 6 Drawing Sheets

ROLLER MECHANISM FOR A LOTTERY TICKET MACHINE

BACKGROUND OF THE INVENTION

This invention relates to a roller mechanism for a lottery ticket machine, particularly to one capable to clamp a lottery ticket between two patterns provided on outer surfaces of two rollers and to increase friction to effectively prevent the lottery ticket from being pulled out when the lottery ticket is pulled by external force, thus preventing a lottery ticket from being stolen by means of a simple structure.

Nowadays, common conventional anti-steal device for a lottery ticket machines shown in FIG. 1 includes a main roller 10, a one-way ratchet wheel 11 positioned by one side of the main roller 11, a control plate 12 provided by the ratchet 11 and having one end combined with a shaft as a pivot to swing and the other end contacting a plate 16 of a motor 15, and a pawl 17 provided to to engage with one of teeth of the ratchet 11.

When a lottery ticket is pulled by external force, the main roller 10, the shaft 18, gears 19, 190 transmit the force of the lottery ticket which is pulled to let the plate 16 to swing with the shaft 18 as a fulcrum and drive the motor 15, with the end of the plate 16 contacting the control plate 12 which is moved upward, with the control plate 12 swinging up with the shaft 13 as a fulcrum to force the pawl 17 to engage the one-way ratchet 11. Then the lottery ticket is prevented from being pulled out.

However, this conventional roller mechanism is too complicated with many components so as to cause difficult assembly, much disorder and high cost.

SUMMARY OF THE INVENTION

The purpose of the invention is to offer a roller device for a lottery ticket machine, having a simpler structure for preventing a lottery ticket from being stolen.

A first feature of the invention is a main roller and a subordinate roller both provided with a rhomboidal cone-shaped pattern on their circumferential surface.

A second feature of the invention is a main roller and a subordinate roller both provided with a sloped cone-shaped pattern on their circumferential surfcae.

A third feature of the invention is a main roller and a subordinate roller both provided with a lateral cone-shaped pattern on their circumferential surface.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
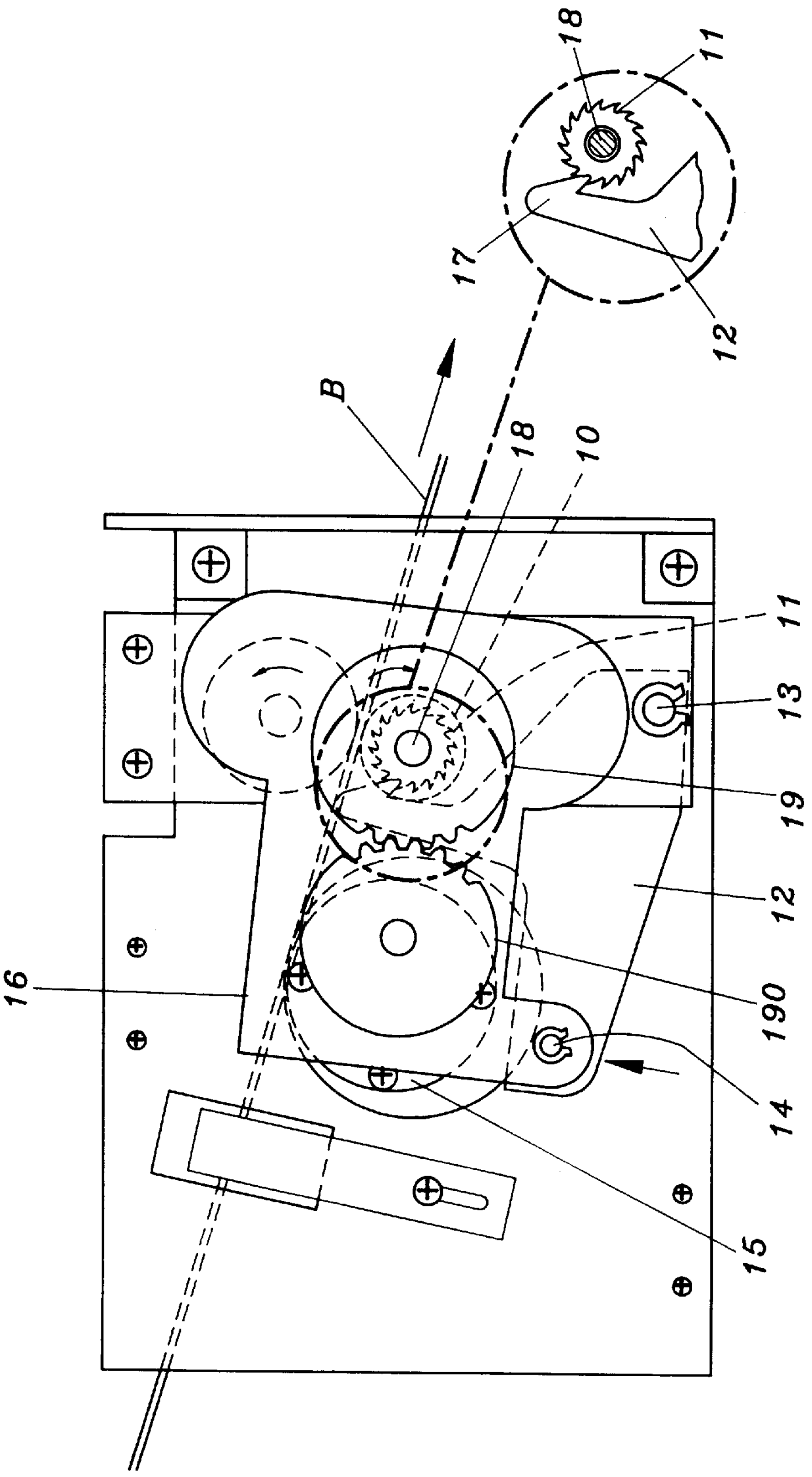
FIG. 1 (PRIOR ART)
FIG. 1 is a side view of an anti-steal device for a conventional lottery ticket machine.
Figure 2:
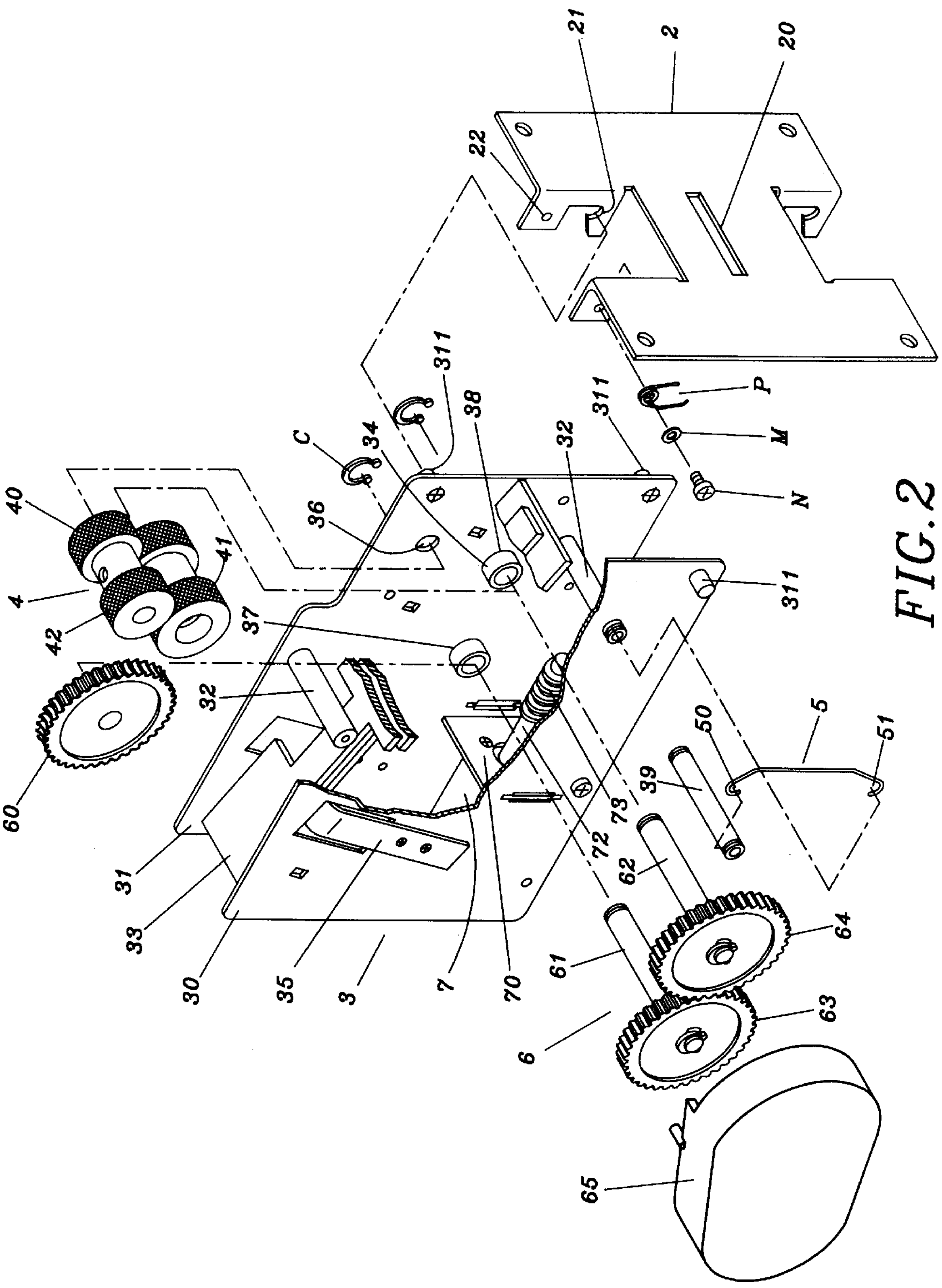
FIG. 2 is an exploded perspective view of a part of a roller mechanism for a lottery ticket machine in the present invention.

A preferred embodiment of a roller mechanism in the present invention, as shown in FIG. 2, includes a face plate 2, a compartment 3, a roller unit 4, two position hook bars 5, a gear unit 6, and a motor device 7.

The face plate 2 has a ticket slot 20 formed in a front center portion, a hook 21 respectively fixed on an upper and a lower portion of a rear side, a screw hole 22 in an upper portion of the rear side.

The compartment 3 is combined with the rear portion of the face plate 2, consisting of two opposite side plates which are a first side plate 30 and a second side plate 31 spaced apart in parallel to form an inner space, a plurality of connect rods 32, a ticket guide plate 33, a plurality of shaft sleeves 34 and two plate springs 35 and a roller shaft 39. The connect rods 32 are located and secured between the two side plates 30, 31. Each of the two side plates 30, 31 has an oval shaft hole 36 and two circular shaft holes 37, 38 each with one shaft sleeve 34 in corresponding locations. Each of the side plates 30 and 31 has two hook stud 311, respectively, fix on an upper and a lower outer surfaces to correspondingly hook with the hooks 21 of the face plate 2. A sloped ticket guide plate 33 is provided between the two side plates 30, 31, with its front end facing the slot 20 of the face plate 2. A plate spring 35 is is provided on an outer side of the first side plate 30.

The roller unit 4 is disposed between the shaft holes 37, 38 of the two side plates 30, 31, consisting of an upper subordinate roller 40 and a lower main roller 41 both provided with a rhomboidal cone-shape pattern on a circumferential surface.

The two position hook bars 5 are shaped like a bow, having two hooks 50, 51 formed in the two ends bent inward, and located at an outer side of each side plates 30, 31.

A gear unit 6 is positioned outside the first side plate 30, consisting of a worm wheel 60, two shafts 61, 62, two gears 63, 64 respectively fixed with the two shafts 61, 62 and a cover 65 shielding over the two gears 63, 64.

Figure 5:
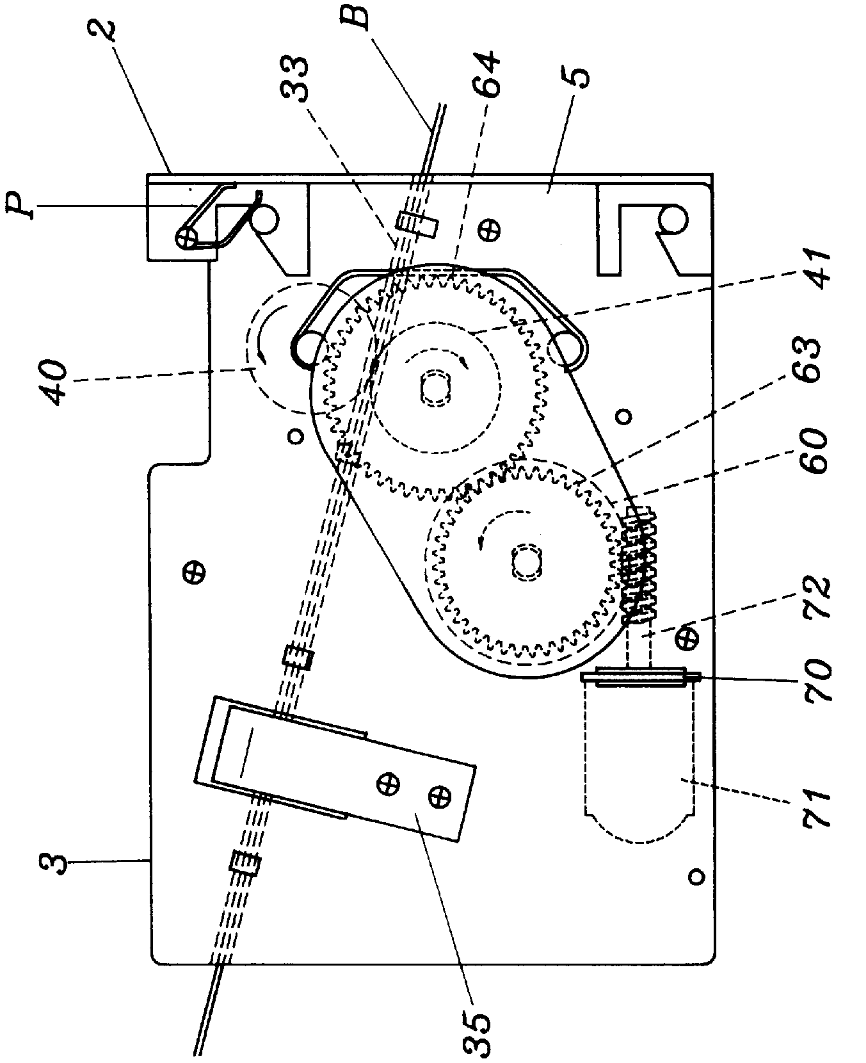
FIG. 5 is an operational view of the roller mechanism in the present invention.

A motor device 7 is positioned between the two side plates 30, 31 as shown in FIG. 5, includes a position base 70, a motor 71 behind the position base 70, a worm 72 extending forward from the motor 71 and having worm gear teeth 73 in a front portion.

Figure 3:
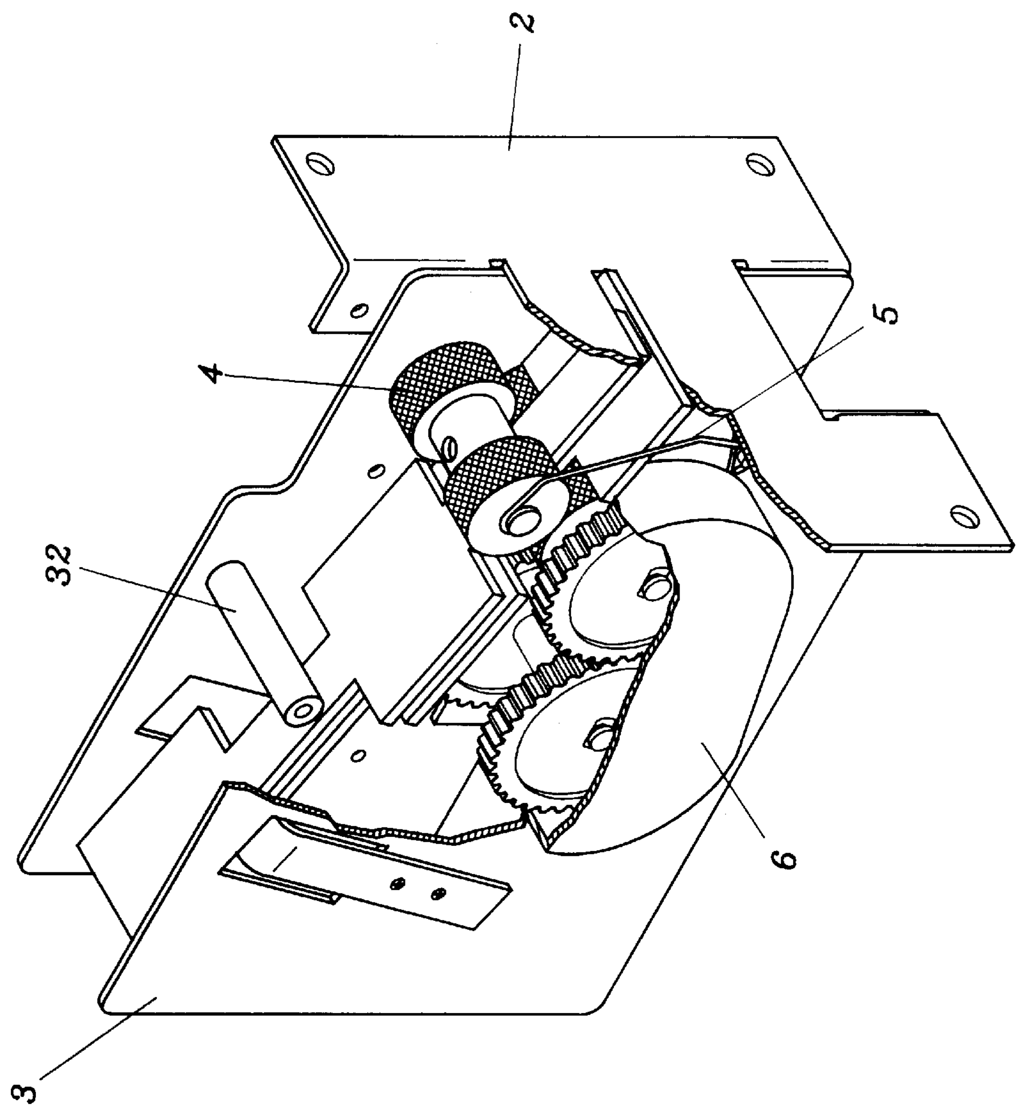
FIG. 3 is a perspective view of a lottery ticket machine provided with the roller mechanism in the present invention.
Figure 4:
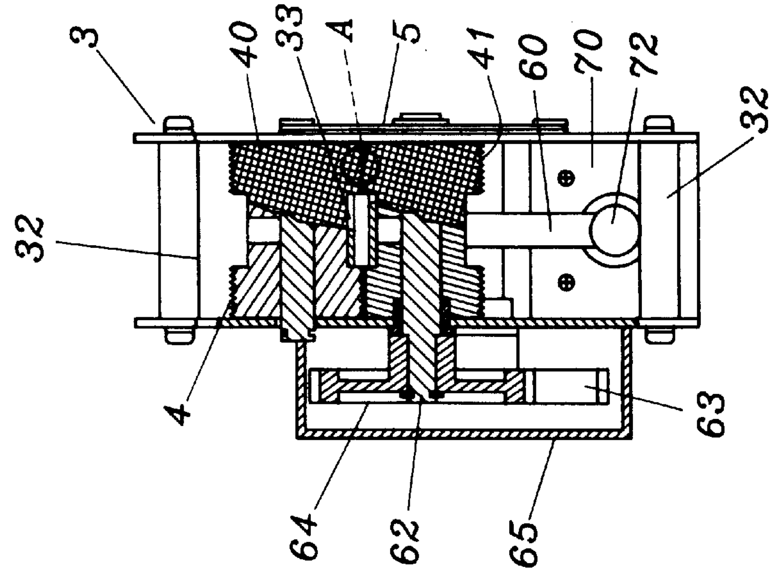
FIG. 4 is a cross-sectional view of FIG. 3.

In assembling, referring to FIGS. 2 , 3 and 4, firstly, the main roller 41, the subordinate roller 40 and the worm wheel 60 are disposed between the two side plates 30, 31, with the main roller 41 facing a first sleeve 34, with the subordinate roller 40 facing the oval shaft hole 36, and with the worm wheel 60 engaging the worm teeth 73. Then the shaft 61 of the gear 63 extends from the first side plate 30 through the sleeve 34 of the shaft hole 37, and the worm wheel 60, and then protrudes to the outside of the second side plate 31 and is secured by a retaining ring C. The shaft 62 of the gear 64 extends from the first side plate 30 through the sleeve 34 of the shaft hole 38 and the main roller 41, and then protrudes to the outside of the second side plate 31 and is secured by a retaining ring C. The gears 63 and 64 outside the first side plate 30 engage with each other. Then the roller shaft 39 is to extend through the shaft holes 36 of the two side plates 30, 31 and the subordinate roller 40 at the same time, with the upper hooks 50 of the two position hook bars 5 hooking the two ends of the roller shaft 39 and with the lower hooks 51 of the two position hook bars 5 hooking the two ends of the connect rod 32. After that, the cover 7 is closed over the gears 63, 64 of the gear unit 6. And then the face plate 2 is lowered down to let the hook 21 to hook the hook studs 311 of the two side plates 30, 31. Then a screw N with a washer M fits through a spring P and in the screw hole 22 of the face plate 2, permitting two ends of the spring P respectively urging the hook studs 311 of the two side plates 30, 31 and a rear wall of the face plate 2 so as to secure the face plate 2 to the side plates 30, 31.

Figure 7:
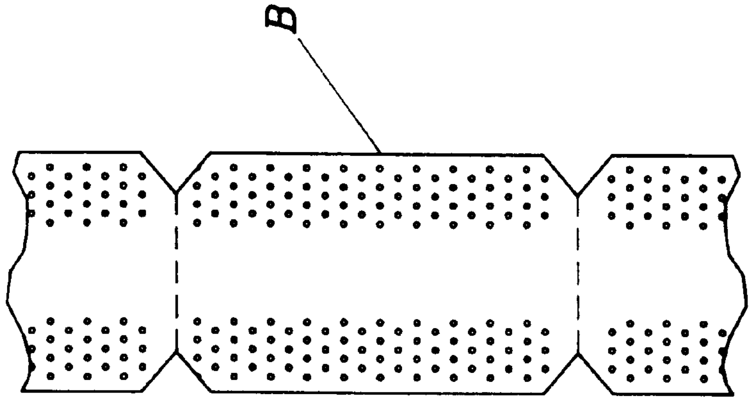
FIG. 7 is a front view of a lottery ticket after being rolled by the rollers in the present invention.
Figure 6:
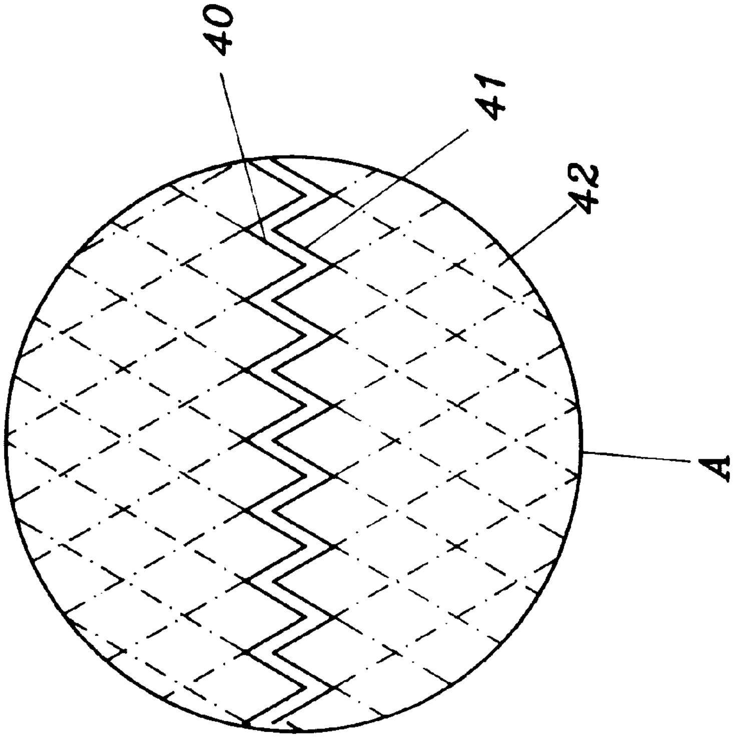
FIG. 6 is an enlarged view of the part A in FIG. 4.

In using, when the motor 71 is started to operate, the worm 72 is rotated to rotate the worm wheel 60, which then rotates synchronously the gear 63 and then the gear 64. The gear 64 then rotates in the reverse direction, with the main roller 41 rotating the subordinate roller 40 in the reverse direction, rolling out a lottery ticket B placed between the main roller 41 and the subordinate roller 40, as shown in FIG. 5. If a lottery ticket B is pulled by external force, the subordinate roller 40 will shrink inward the position hook bars 5, tightly engaging the main roller 41 as shown in FIG. 6, and the rhomboidal cone-shaped patterns 42 of the main roller 41 and the subordinate roller 40 pinch the upper and the lower sides of a lottery ticket B, preventing the ticket B from being pulled out by force, and thus the lottery ticket B may be clampingly rolled, unable to be printed with the rhomboidal cone-shaped pattern but to be printed with continuous dots as shown in FIG. 7, which marks unqualified unlawful lottery tickets B.

Figure 9:
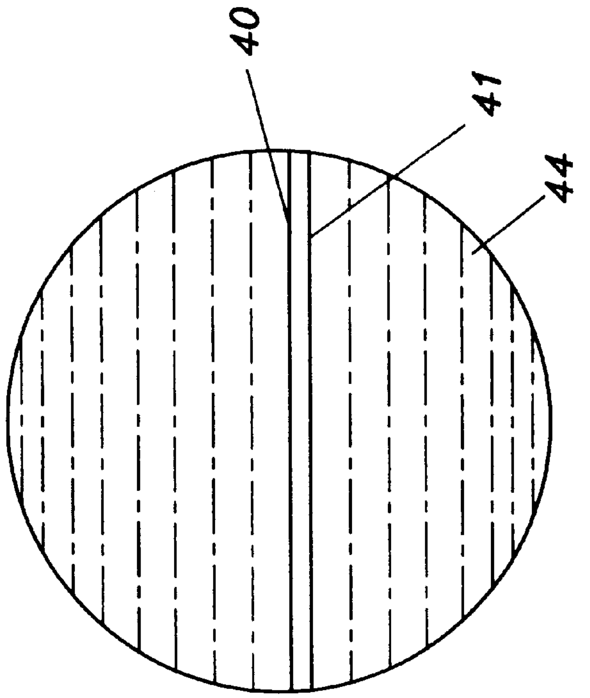
Figure 8:
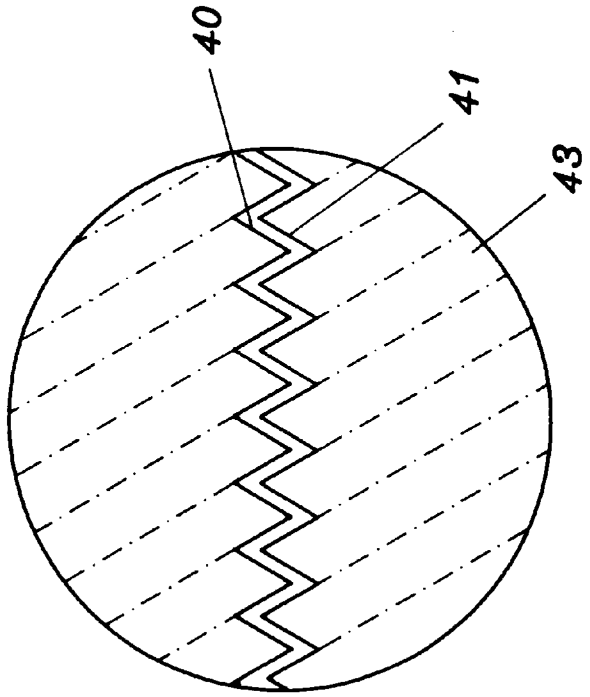
FIG. 8 is an enlarged view of a pattern of the rollers of a second pattern of the rollers in the present invention; and, FIG. 9 is an enlarged view of a pattern of the rollers of a third pattern of the rollers in the present invention.

The rhomboidal cone-shaped pattern of the main roller 41 and the subordinate roller 41 may be replaced with a sloped cone-shaped pattern 43 as shown in FIG. 8, or a lateral cone-shaped pattern as shown in FIG. 9, attaining the same function of clampingly rolling the lottery ticket B to let the patterns of the main roller 41 and the subordinate roller 40 to engage with each other for increasing friction, preventing a lottery ticket B from being pulled out by force.

The present invention has the following advantages which can be understood from the above description:

1. It can surely prevent the lottery ticket from being stolen by force.
2. It has a simple structure to be easily assembled.

While the preferred embodiment of the invention has been described above, it will be recognized and understood that various modifications may be made therein and the appended claims are intended to cover all such modifications which may fall within the spirit and scope of the invention.

What is claimed is:

1. A roller mechanism for a lottery ticket machine comprising:

a face plate having a slot for dispensing lottery tickets formed in a front side thereof;

a compartment positioned behind said face plate consisting of a first side plate and a second side plate which are spaced apart in parallel to form a space therebetween, said side plates respectively having a plurality of shaft holes at corresponding locations;

a roller unit located between said first and second side plates of said compartment, said roller unit consisting of a main roller and a subordinate roller, said subordinate roller being mounted on a roller shaft which extends between and outside said first and second side plates;

a gear unit consisting of two gears positioned outside said first side plate of said compartment and a worm wheel positioned in said compartment, said two gears being fixed on two shafts which extending in said compartment, said shafts of said two gears being fitted through and fixed tightly to rotate said worm wheel and said main roller, respectively, protruding out of said shaft holes of said second side plate and being secured with retaining rings;

a motor device fixed in said compartment between said first and second side plates, said motor device having a shaft connected with a worm engaging said worm wheel; and two position hook bars located outside each one of said first and second side plates of said compartment, each of said position hook bars having a hook respectively formed at an upper end and a lower end thereof, each of said hooks at said upper ends elastically hooking a respective end of said roller shaft and each of said hooks at said lower ends hooking a respective end of a connect rod such that said subordinate roller is pressed inward by said position hook bars so as to tightly engage said main roller and thus tightly clamp a lottery ticket placed between said main and subordinate rollers to prevent the lottery ticket from being pulled out forcefully;

wherein said main and subordinate rollers each have a circumferential surface provided with a rhomboidal cone-shaped pattern, said rhomboidal cone-shaped patterns of said main and subordinate rollers being arranged to clampingly roll the lottery ticket placed between said main and subordinate rollers and to increase friction to prevent the lottery ticket from being pulled forcefully when the lottery ticket is pulled by an external force such that said roller mechanism prevents the lottery ticket from being stolen.

2. A roller mechanism for a lottery ticket machine comprising:

a face plate having a slot for dispensing lottery tickets formed in a front side thereof;

a compartment positioned behind said face plate consisting of a first side plate and a second side plate which are spaced apart in parallel to form a space therebetween, said side plates respectively having a plurality of shaft holes at corresponding locations;

a roller unit located between said first and second side plates of said compartment, said roller unit consisting of a main roller and a subordinate roller, said subordinate roller being mounted on a roller shaft which extends between and outside said first and second side plates;

a gear unit consisting of two gears positioned outside said first side plate of said compartment and a worm wheel positioned in said compartment, said two gears being fixed on two shafts which extending in said compartment, said shafts of said two gears being fitted through and fixed tightly to rotate said worm wheel and said main roller, respectively, protruding out of said shaft holes of said second side plate and being secured with retaining rings;

a motor device fixed in said compartment between said first and second side plates, said motor device having a shaft connected with a worm engaging said worm wheel; and two position hook bars located outside each one of said first and second side plates of said compartment, each of said position hook bars having a hook respectively formed at an upper end and a lower end thereof, each of said hooks at said upper ends elastically hooking a respective end of said roller shaft and each of said hooks at said lower ends hooking a respective end of a connect rod such that said subordinate roller is pressed inward by said position hook bars so as to tightly engage said main roller and thus tightly clamp a lottery ticket placed between said main and subordinate rollers to prevent the lottery ticket from being pulled out forcefully;

wherein said main and subordinate rollers each have a circumferential surface provided with a sloped cone-shaped pattern, said sloped cone-shaped patterns of said main and subordinate rollers being arranged to clampingly roll the lottery ticket placed between said main and subordinate rollers and to increase friction to prevent the lottery ticket from being pulled forcefully when the lottery ticket is pulled by an external force such that said roller mechanism prevents the lottery ticket from being stolen.

3. A roller mechanism for a lottery ticket machine comprising:

a face plate having a slot for dispensing lottery tickets formed in a front side thereof;

a compartment positioned behind said face plate consisting of a first side plate and a second side plate which are spaced apart in parallel to form a space therebetween, said side plates respectively having a plurality of shaft holes at corresponding locations;

a roller unit located between said first and second side plates of said compartment, said roller unit consisting of a main roller and a subordinate roller, said subordinate roller being mounted on a roller shaft which extends between and outside said first and second side plates;

a gear unit consisting of two gears positioned outside said first side plate of said compartment and a worm wheel positioned in said compartment, said two gears being fixed on two shafts which extending in said compartment, said shafts of said two gears being fitted through and fixed tightly to rotate said worm wheel and said main roller, respectively, protruding out of said shaft holes of said second side plate and being secured with retaining rings;

a motor device fixed in said compartment between said first and second side plates, said motor device having a shaft connected with a worm engaging said worm wheel; and two position hook bars located outside each one of said first and second side plates of said compartment, each of said position hook bars having a hook respectively formed at an upper end and a lower end thereof, each of said hooks at said upper ends elastically hooking a respective end of said roller shaft and each of said hooks at said lower ends hooking a respective end of a connect rod such that said subordinate roller is pressed inward by said position hook bars so as to tightly engage said main roller and thus tightly clamp a lottery ticket placed between said main and subordinate rollers to prevent the lottery ticket from being pulled out forcefully;

wherein said main and subordinate rollers each have a circumferential surface provided with a lateral cone-shaped pattern, said lateral cone-shaped patterns of said main and subordinate rollers being arranged to clampingly roll the lottery ticket placed between said main and subordinate rollers and to increase friction to prevent the lottery ticket from being pulled forcefully when the lottery ticket is pulled by an external force such that said roller mechanism prevents the lottery ticket from being stolen.

* * * * *